US007886295B2

(12) United States Patent
Burger et al.

(10) Patent No.: US 7,886,295 B2
(45) Date of Patent: Feb. 8, 2011

(54) CONNECTION MANAGER, METHOD, SYSTEM AND PROGRAM PRODUCT FOR CENTRALLY MANAGING COMPUTER APPLICATIONS (75) Inventors: Ernest J. Burger, Highland, NY (US); Maria T. Kapogiannis, Poughkeepsie, NY (US); Andrew C. Stafford, Rocky River, OH (US); So Ying Tse-Lam, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1590 days.

(21) Appl. No.: 11/059,892

(22) Filed: Feb. 17, 2005

(65) Prior Publication Data

US 2006/0190948 A1  Aug. 24, 2006

(51) Int. Cl.
*G06F 9/46* (2006.01)
*G06F 13/00* (2006.01)
*G06F 11/00* (2006.01)

(52) U.S. Cl. .......... 718/100; 718/101; 719/313; 719/314; 719/315; 719/318; 719/329; 714/25; 714/39; 714/47; 714/51

(58) Field of Classification Search .......... 718/1, 718/100–106; 719/312, 313, 314, 315, 318, 719/329; 714/1, 2, 25, 37, 38, 39, 47, 51
See application file for complete search history.

(56) References Cited

U.S. PATENT DOCUMENTS

| 5,329,619 | A | * | 7/1994 | Page et al. .......... 709/203 |
| 5,504,897 | A | * | 4/1996 | Gans et al. .......... 707/104.1 |
| 6,192,413 | B1 | * | 2/2001 | Lee et al. .......... 709/238 |
| 6,237,079 | B1 | * | 5/2001 | Stoney .......... 712/34 |
| 6,256,676 | B1 | | 7/2001 | Taylor et al. |
| 6,370,656 | B1 | | 4/2002 | Olarig et al. |
| 6,425,017 | B1 | * | 7/2002 | Dievendorff et al. .......... 719/315 |
| 6,434,605 | B1 | | 8/2002 | Faulkner et al. |
| 6,457,142 | B1 | | 9/2002 | Klemm et al. |
| 6,470,346 | B2 | * | 10/2002 | Morwood .......... 1/1 |

(Continued)

FOREIGN PATENT DOCUMENTS

JP  09022368 A  *  1/1997

(Continued)

OTHER PUBLICATIONS

MQSeries Publish/Subscribe Applications; IBM Redbooks; Sep. 2001; 244 pages.*

(Continued)

*Primary Examiner*—Li B Zhen
*Assistant Examiner*—Abdullah Al Kawsar
(74) *Attorney, Agent, or Firm*—William E. Schiesser; Hoffman Warnick LLC (57) ABSTRACT The present invention provides a connection manager, method, system and program product for centrally managing computer applications. Specifically, under the present invention, a connection manager is provided that centrally manages the applications through a queue broker, and communicates with components of a heartbeat manager and cleanup manager. The connection manager of the present invention provides, among other things, a centralized point for: (1) applications to directly connect to one another; (2) heartbeats of the applications to be monitored; and (3) any necessary cleanup actions to be implemented.

14 Claims, 6 Drawing Sheets

U.S. PATENT DOCUMENTS

| | | | |
|---|---|---|---|
| 6,654,801 | B2 | 11/2003 | Mann et al. |
| 6,662,217 | B1 * | 12/2003 | Godfrey et al. ............. 709/219 |
| 6,718,376 | B1 * | 4/2004 | Chu et al. .................. 709/223 |
| 6,735,601 | B1 | 5/2004 | Subrahmanyam |
| 6,760,911 | B1 * | 7/2004 | Ye ............................. 719/314 |
| 6,804,794 | B1 | 10/2004 | Robidoux et al. |
| 6,857,012 | B2 * | 2/2005 | Sim et al. ................... 709/222 |
| 7,080,385 | B1 * | 7/2006 | Collison et al. ............. 719/318 |
| 7,127,507 | B1 | 10/2006 | Clark et al. |
| 7,174,556 | B2 * | 2/2007 | Lambert ..................... 719/315 |
| 7,181,482 | B2 * | 2/2007 | Jain et al. ................... 707/206 |
| 7,376,957 | B1 | 5/2008 | Scurlock, Jr. |
| 7,458,079 | B2 * | 11/2008 | Connelly .................... 719/313 |
| 7,490,083 | B2 * | 2/2009 | Bourbonnais et al. ............. 1/1 |
| 2002/0064126 | A1 | 5/2002 | Bhattal et al. |
| 2002/0120546 | A1 * | 8/2002 | Zajac .......................... 705/37 |
| 2002/0120717 | A1 * | 8/2002 | Giotta ........................ 709/219 |
| 2002/0144010 | A1 | 10/2002 | Younis et al. |
| 2002/0165892 | A1 | 11/2002 | Grumann et al. |
| 2003/0014477 | A1 * | 1/2003 | Oppenheimer et al. ...... 709/203 |
| 2003/0041000 | A1 * | 2/2003 | Zajac et al. ................... 705/37 |
| 2003/0078946 | A1 | 4/2003 | Costello et al. |
| 2003/0088549 | A1 | 5/2003 | Iulo et al. |
| 2003/0093576 | A1 * | 5/2003 | Dettinger et al. ............. 709/313 |
| 2003/0101379 | A1 | 5/2003 | Bates et al. |
| 2003/0144894 | A1 * | 7/2003 | Robertson et al. ................ 705/8 |
| 2003/0177187 | A1 * | 9/2003 | Levine et al. ................ 709/205 |
| 2004/0010716 | A1 | 1/2004 | Childress et al. |
| 2004/0030778 | A1 | 2/2004 | Kronenberg et al. |
| 2004/0098726 | A1 * | 5/2004 | Currie et al. ................. 719/310 |
| 2004/0205439 | A1 * | 10/2004 | Carmeli et al. ............. 714/748 |
| 2004/0236780 | A1 * | 11/2004 | Blevins et al. .............. 707/102 |
| 2005/0114867 | A1 * | 5/2005 | Xu et al. ...................... 719/318 |
| 2005/0198614 | A1 * | 9/2005 | Mavashev et al. ........... 717/102 |

FOREIGN PATENT DOCUMENTS

WO      WO 02/39351 A2      5/2002

OTHER PUBLICATIONS

Stefan Tai et al.; Message Queuing Patterns for Middleware-Mediated Transactions; A. Coen-Porisini and A. van der Hoek (Eds.): SEM 2002, LNCS 2596, pp. 174-186, 20.*

Arcos, Jeison, U.S. Appl. No. 11/073,793, Office Action dated Mar. 5, 2009, 14 pages.

Arcos, Jeison, U.S. Appl. No. 11/073,793, Final Office Action dated Jun. 11, 2008, 13 pages.

Arcos, Jeison, U.S. Appl. No. 11/073,793, Office Action dated Dec. 12, 2007, 23 pages.

Unknown, "Overview of the Adapter", http://publib.boulder.ibm.com/infocenter/wblhelp/v6rxmx/topic/com., retrieved Dec. 3, 2007, 6 pages.

Denaro, et al., "Early Performance Testing of Distributed Software Applications", WOSP 04, Jan. 14-16, 2004, Redwood City, CA, 10 pages.

Mueller, et al., "A Background Layer of Health Monitoring and Error Handing for ObjectAgent", Copyright 2001, AAA1, 9 pages.

Unknown, "BEA Tuxedo/Q Guide", Copyright 1999, Bea Systems, Inc., 49 pages.

Godefroid, et al., "Model Checking Without a Model: An Analysis of the Heart-Beat Monitor of a Telephone Switch using VeriSoft", ISSTA 98, Clearwater Beach, Florida, 1998, 10 pages.

Kotik, et al., "Automating Software Analysis and Testing Using a Program Transformation System", Copyright 1989, ACM, 10 pages.

* cited by examiner

| GTC_Manager | |
|---|---|
| ResourceID | TIMESTAMP |
| AppID | VARCHAR(64) <pk> |
| ConnectToID | VARCHAR(64) |
| State | VARCHAR(64) |
| ConnectType | VARCHAR(64) |
| CREATE_DATE | TIMESTAMP |
| LAST_MODIFIED_DATE | TIMESTAMP |

FIG. 3B

| GTC_Cleanup | |
|---|---|
| ObjectID | INTEGER <pk> |
| ResourceID | TIMESTAMP |
| AppID | VARCHAR(64) |
| Keyword | VARCHAR(32) |
| Value | VARCHAR(256) |
| Hostname | VARCHAR(64) |
| Port | INTEGER |
| BrokerQmgr | VARCHAR(64) |
| Channel | VARCHAR(64) |
| BrokerConQ | VARCHAR(64) |
| ExpirationDate | TIMESTAMP |
| CREATE_DATE | TIMESTAMP |
| LAST_MODIFY_DATE | TIMESTAMP |

FIG. 3C

| GTC_Manager | | |
|---|---|---|
| AppID | VARCHAR(64) | <pk> |
| HeartRate | INTEGER | |
| MaxSkippedBeats | INTEGER | |
| LastHeartBeat | TIMESTAMP | |
| ExpirationDate | TIMESTAMP | |
| CREATE_DATE | TIMESTAMP | |
| LAST_MODIFY_DATE | TIMESTAMP | |

CONNECTION MANAGER, METHOD, SYSTEM AND PROGRAM PRODUCT FOR CENTRALLY MANAGING COMPUTER APPLICATIONS

CROSS-REFERENCE TO RELATED APPLICATION

This application is related in some aspects to the co-pending U.S. application Ser. No. 11/073,793 and entitled "Method, System and Program Product for Monitoring a Heartbeat of a Computer Application," which is herein incorporated by reference.

FIELD OF THE INVENTION

In general, the present invention relates to computer application management. Specifically, the present invention relates to a connection manager, method, system and program product for centrally managing computer applications.

BACKGROUND OF THE INVENTION

As the pervasiveness of computer applications (hereinafter "applications") continues to grow, there is a growing need to be able to centrally manage applications implemented within a computer environment. For example, a given environment might have several applications intended to operate at any particular time. These applications might desire to connect with one another directly. Moreover, it could be the case that one or more of these applications is experiencing an error condition that prevents proper operation. Given that a number of applications could be implemented within the environment, the complete management of such applications can be complicated.

Currently, many environments implement messaging schemes to facilitate communication among the applications or components of the environment. One popular scheme is known as MQSeries messaging, which is commercially available from International Business Machines Corp. of Armonk N.Y. Under MQSeries, an application can utilize one or more message queues for handling messages. In addition, MQSeries also provides a queue broker through which messages can be routed and/or brokered.

Unfortunately, no existing system takes advantage of existing messaging and queue technology in providing centralized management of applications. That is, no existing system has devised a way to utilize messaging queues and queue brokers in order to manage the applications. In view of the foregoing, there exists a need for a connection manager, method, system and program product for centrally managing computer applications. Specifically, a need exists for a system that provides central management of connections between applications as well as a system that can monitor heartbeats of the applications to detect when an application fails. Still yet, a need exists for the system to centrally facilitate any cleanup actions that must be taken such as when an application fails.

SUMMARY OF THE INVENTION

In general, the present invention provides a connection manager, method, system and program product for centrally managing computer applications. Specifically, under the present invention, a connection manager is provided that centrally manages the applications through a queue broker, and communicates with components of a heartbeat manager and cleanup manager. The connection manager of the present invention provides, among other things, a centralized point for: (1) applications to directly connect to one another; (2) heartbeats of the applications to be monitored; and (3) any necessary cleanup actions to be implemented.

A first aspect of the present invention provides a connection manager for centrally managing computer applications, comprising: means for registering the connection manager with a queue broker; means for monitoring a connection manager command queue that receives request messages from the queue broker that are posted to the queue broker by the computer applications; means for processing the request messages monitored in the connection manager command queue; means for communicating response messages, pursuant to the processing of the request messages, to the queue broker; and means for establishing connections between the computer applications.

A second aspect of the present invention provides a method for centrally managing computer applications, comprising: registering a computer application with a connection manager and a queue broker; receiving heartbeat messages in a heartbeat queue that is monitored by a heartbeat manager from the computer applications; the heartbeat manager putting a dead application message in a connection manager command queue that is monitored by the connection manager if the heartbeat messages are not received; and the connection manager putting a cleanup message in a cleanup queue that is monitored by a cleanup manager in response to the dead application message being put in the connection manager command queue.

A third aspect of the present invention provides a method for centrally connecting computer applications, comprising: registering a first computer application and a second computer application with a queue broker and a connection manager; receiving, on the connection manager, a request from the first computer application to connect to the second computer application; creating a connection record in a connection manager table that is managed by the connection manager; creating a set of dynamic queues for communication between the first application and the second computer application; creating a subscription for the first application and the second application; and communicating a connection message from the connection manager to the first computer application and the second computer application.

A fourth aspect of the present invention provides a system for centrally managing computer applications, comprising: a connection manager for receiving and processing request messages from the computer applications; a heartbeat manager for monitoring a heartbeat of the computer applications; and a cleanup manager for implementing cleanup actions for the computer applications.

A fifth aspect of the present invention provides a program product stored on a computer readable medium for centrally managing computer applications, the computer readable medium comprising program code for performing the following steps: registering a connection manager with a queue broker; monitoring a connection manager command queue that receives request messages from the queue broker that are posted to the queue broker by the computer applications; processing the request messages monitored in the connection manager command queue; communicating response messages, pursuant to the processing of the request messages, to the queue broker; and establishing connections between the computer applications.

A sixth aspect of the present invention provides computer software embodied in a propagated signal for centrally managing computer applications, the computer software comprising instructions to cause a computer system to perform the following functions: register a connection manager with a queue broker; monitor a connection manager command queue that receives request messages from the queue broker that are posted to the queue broker by the computer applications; process the request messages monitored in the connection manager command queue; communicate response messages, pursuant to the processing of the request messages, to the queue broker; and establish connections between the computer applications.

A seventh aspect of the present invention provides a method for deploying an application for centrally managing computer applications, comprising: providing a computer infrastructure being operable to: register a computer application with a connection manager and a queue broker; receive heartbeat messages in a heartbeat queue that is monitored by a heartbeat manager from the computer applications; put a dead application message in a connection manager command queue that is monitored by the connection manager if the heartbeat messages are not received; and put a cleanup message in a cleanup queue that is monitored by a cleanup manager in response to the dead application message being put in the connection manager command queue.

An eighth aspect of the invention provides a computer-readable medium that includes computer program code to enable a computer infrastructure to build social networks.

A ninth aspect of the invention provides a business method for building social networks.

Therefore, the present invention provides a connection manager, method, system and program product for centrally managing computer applications.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

For convenience purposes, the Best Mode for Carrying Out the Invention will have the following sections:
I. General Description
II. Computerized Implementation I. General Description As indicated above, the present invention provides a connection manager, method, system and program product for centrally managing computer applications. Specifically, under the present invention, a connection manager is provided that centrally manages the applications through a queue broker, and communicates with components of a heartbeat manager and cleanup manager. The connection manager of the present invention provides, among other things, a centralized point for: (1) applications to directly connect to one another; (2) heartbeats of the applications to be monitored; and (3) any necessary cleanup actions to be implemented.

Figure 1:
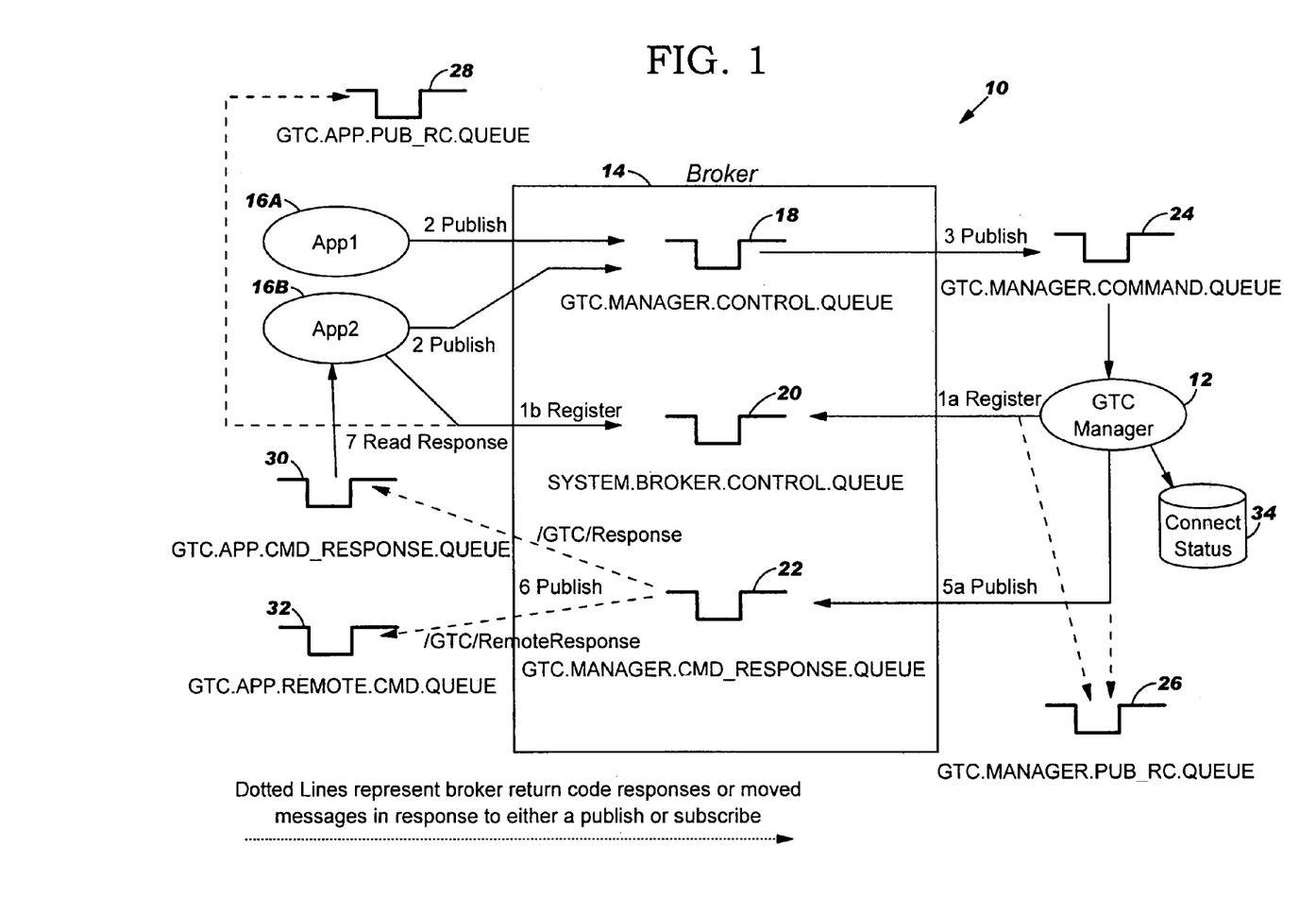
FIG. 1 depicts a connection manager centrally managing applications using a queue broker according to the present invention.

Referring now to FIG. 1, a system 10 for centrally managing computer applications (hereinafter "applications") in a computing environment is shown. In general, the present invention manipulates various queues to provide centralized management. To this extent, FIG. 1 depicts a queue broker 14 having connection manager control queue 18, broker control queue 20, and connection manager response queue 22. It should be understood that in a typical embodiment, the queues of the present invention are MQSeries queues, while queue broker 14 is an MQSeries broker although this need not be the case. In any event, FIG. 1 further depicts connection manager 12 and applications 16A-B.

To provide centralize management under the present invention connection manager 12 and applications 16A-B will first register/subscribe with queue broker 14. The following steps describe the registration of connection manager 12 and applications 16A-B, respectively:

(A) Register Connection Manager 12

Upon connection manager 12 startup, the connection manager 12 sends a registration message to the broker control queue 20 of queue broker 14. The registration generally comprises a "Topic="GTC/Command." In addition, connection manager 12 will set connection manager command queue 24 as the reply to queue. This enables any application request messages placed on the connection manager control queue 18 to be forwarded to the connection manager command queue 24, which is monitored/read by connection manager 12. The connection manager 12 will also set the connection manager return code queue 26 as the queue for any return code (e.g., MQSeries message report) information to be placed. This way, connection manager 12 can check return codes from its publish and subscription actions to make sure that they were successful.

(B) Register Applications 16A-B

Upon startup of any application (e.g. application 16A), the application will send two registration messages to broker control queue 20 of queue broker 14. The messages and their response queue's are as follows (1) Topic="GTC/Response." For this message, application response queue 30 is set as the ReplyToQueue; and (2) Topic="GTC/RemoteResponse." For this message application remote response queue 32 is set as the ReplyToQueue.

These settings enable the application 16A to receive response messages back from connection manager 12, after application 16A has sent a command or request message to the connection manager 12. In addition, application 16A will set the application return code queue 28 as the queue for any return code (e.g., MQSeries message report) information to be placed. This way, application 16A can similarly check return codes from its publish and subscription actions to make sure that they were successful. In addition, application 16A will publish a registration message to connection manager control queue 18, which is put in connection manager command queue 24. Upon reading such a message, connection manager will create a record for application 16A in connection manager database/table 34.

Once connection manager 12 and applications 16A-B have registered/subscribed, applications 16A-B can begin publishing commands/messages (e.g., register, unregister, connect, disconnect) to connection manager 12, and then check the application return code queue 28 to make sure queue broker 14 successfully handled the publishing of the command.

Assume in an illustrative example, that application 16A is issuing a request message. The request message will be received on connection manager control queue 18 of queue broker 14. Upon receipt, queue broker 14 will move the request message to connection manager command queue 24, which is monitored by connection manager 12. connection manager 12 will read request message from connection manager command queue 24, and process it and update connection manager table 34 with the status. connection manager 12 will then publish a response message in the application. Specifically, connection manager 12 will publish a response message to connection manager response queue 22. Queue broker 14 will then put the response message in the appropriate application response queue, either application response queue 30 or remote application response queue 32. At this point in time, application 16A can read the response from the response queue.

Figure 2:
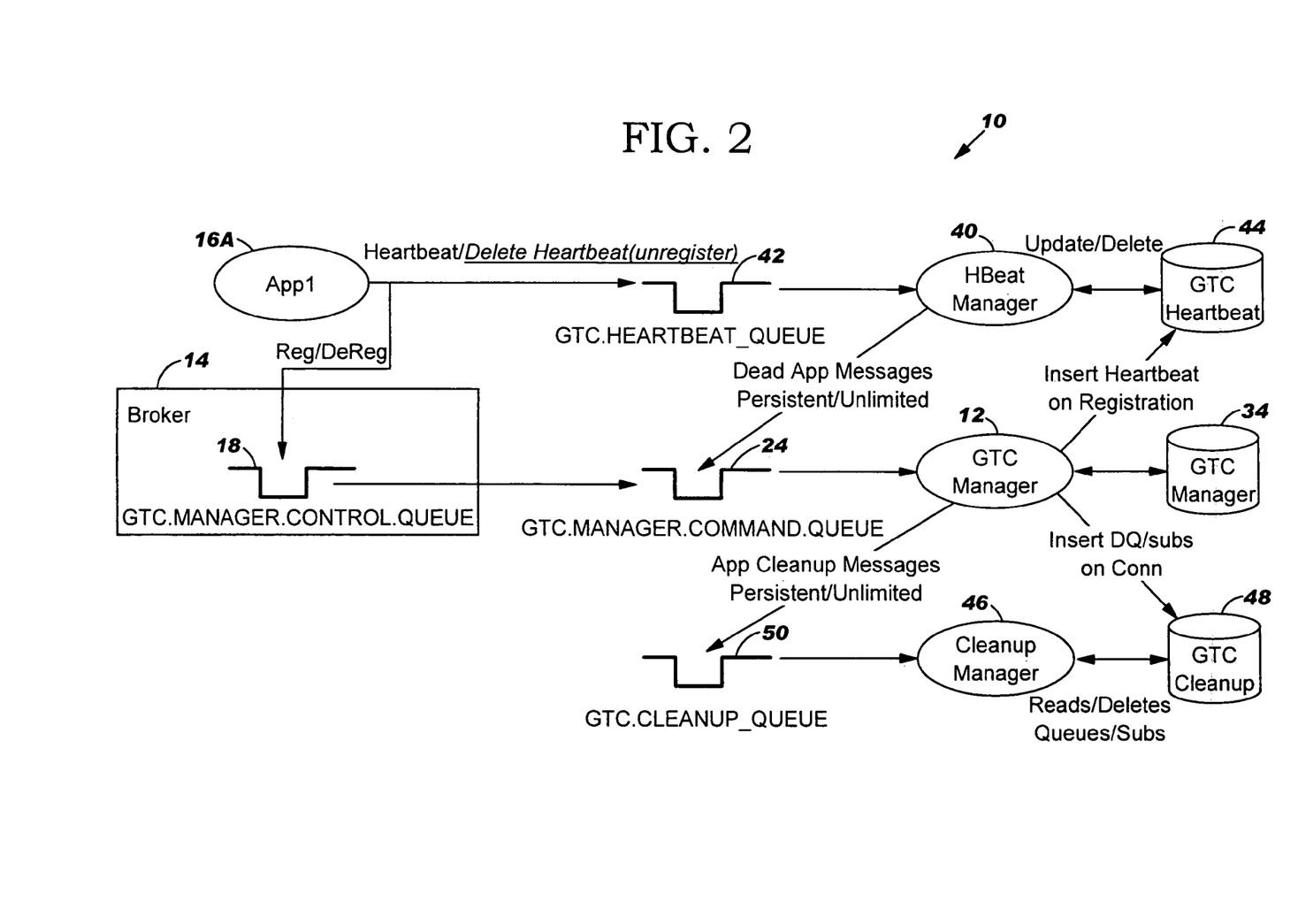
FIG. 2 depicts the connection manager of FIG. 1 working in conjunction with a heartbeat manager and a cleanup manager according to the present invention.

Referring now to FIG. 2, connection manager 12 is shown working in conjunction with a heartbeat manager 40 and a cleanup manager 46 according to the present invention. Although shown as separate components, it should be appreciated that connection manager 12, heartbeat manager 40 and cleanup manager 46 could be embodied as a single application. In a typical embodiment such an application can be a Java application, which can centrally manage communications between applications through the use of a client side API (Application Programming Interface), and server side utilities that manage communications setup and cleanup. Moreover, the majority of the code under the present invention can be located on the server-side utilities so that the amount of coding needed to be done in the client applications can be reduced, thus increasing client side performance by having the server perform many of the tasks. This will also increase quality by using proven and tested methods to cleanup, rather than having each client code and execute these tasks individually.

In any event, connection manager 12, heartbeat manager 40 and cleanup manager 46 can actually comprise of three separate management Java programs or services. connection manager 12 is designed to process commands/messages sent from applications, such as register, unregister, connect, and disconnect commands. Heartbeat manager 40 is used to process heartbeat messages sent out by the registered applications to let connection manager 12 know that the application is still available, and has not "died" unexpectedly. Cleanup manager 46 is used to clean up queues and other entries in cleanup table 48 after an application has died, unregistered, or disconnected.

Figure 3A:
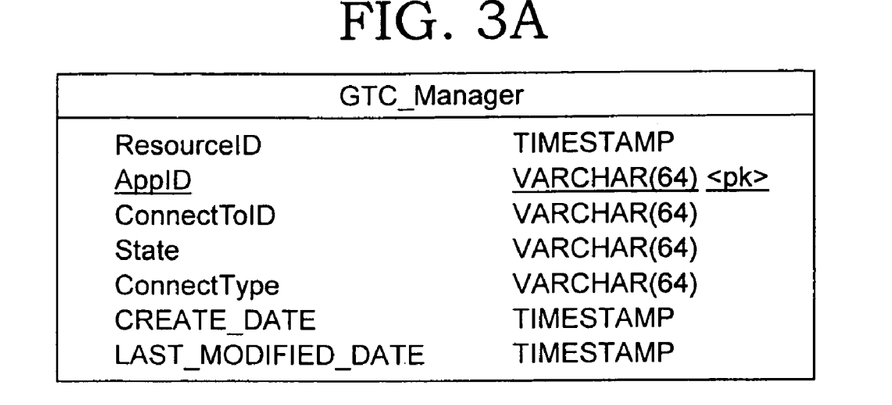
FIG. 3A depicts a database table used to store information used by the connection manager according to the present invention.
Figure 3B:
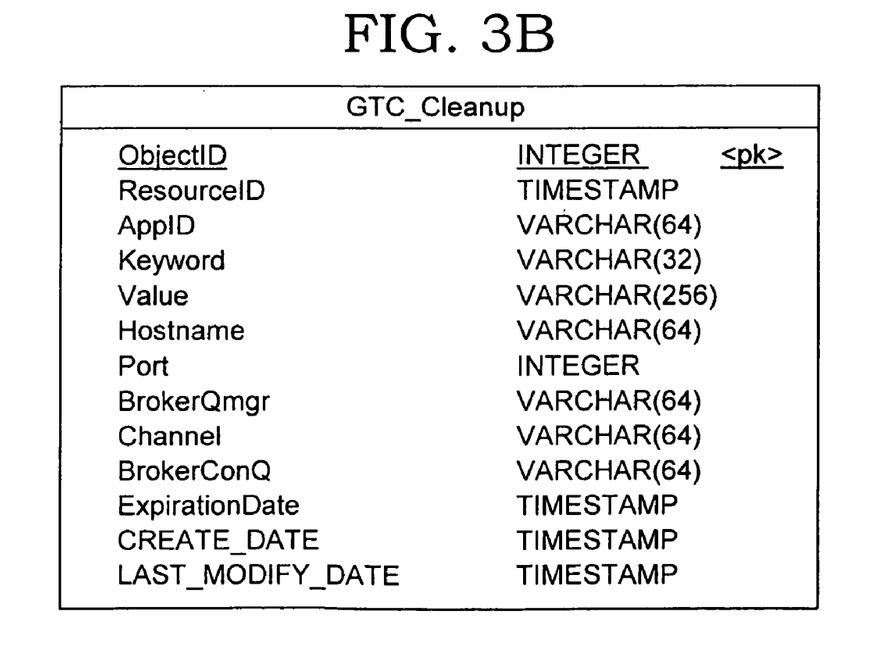
FIG. 3B depicts a database table used to store information used by the cleanup manager according to the present invention.
Figure 3C:
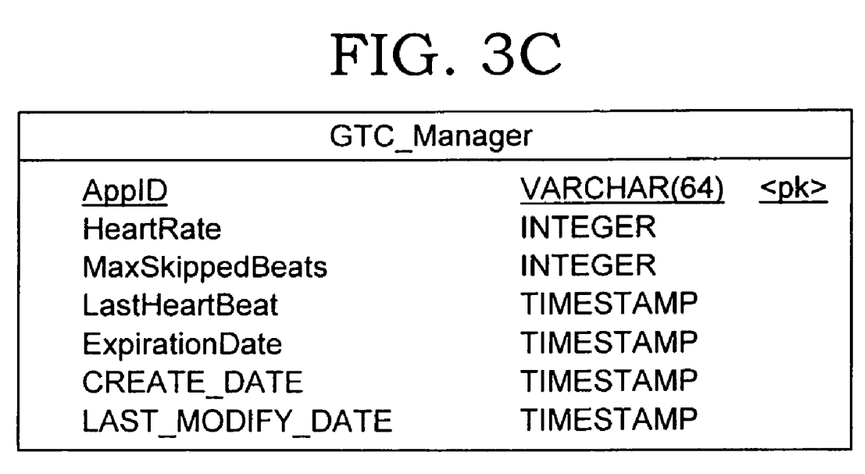
FIG. 3C depicts a database table used to store information used by the heartbeat manager according to the present invention.
Figure 4:
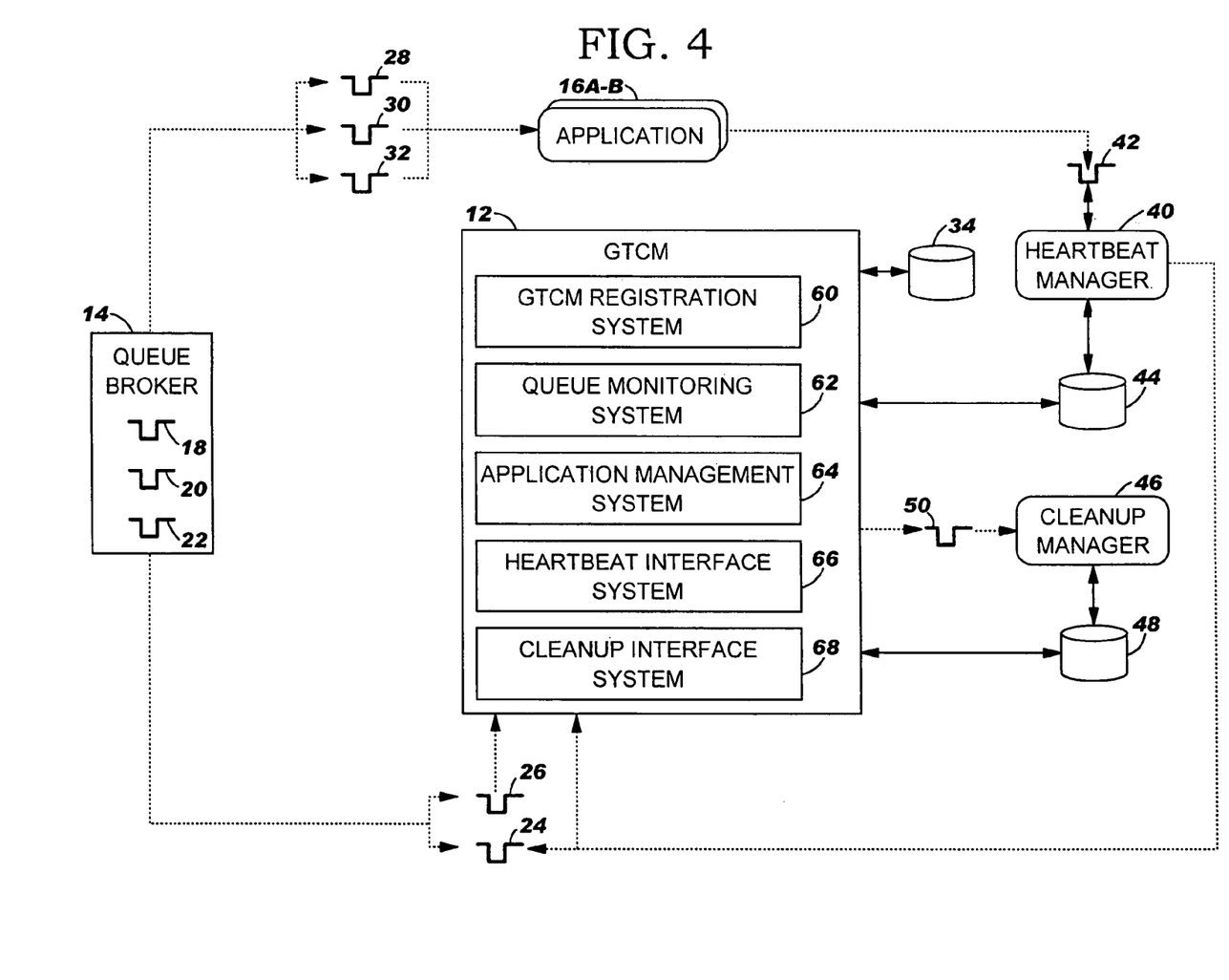
FIG. 4 depicts the connection manager of FIG. 1 in greater detail.

A more detailed description of the functions and interrelationships between these components will be further described in conjunction with the illustrative usage scenarios and FIG. 4. However, before such scenarios are described, their basic functions will be described. As indicated above, connection manager 12 centrally manages applications such as application 16A. This includes, among other things, creating direct connections between applications. When application 16A is initially registered, connection manager 12 will create corresponding records for application 16A is connection manager table 34, heartbeat database table 44 (as managed by heartbeat manager 40) and cleanup database/table 48 (as managed by cleanup manager 46). FIGS. 3A-C depict generic database table structures, which would hold the information about application 16A. For example, FIGS. 3A-C depict illustrative records for application 16A in connection manager table 24, cleanup table 48 and heartbeat table 44 and heartbeat table, respectively.

Regardless, referring back to FIG. 2, once application 16A is registered (e.g., by publishing a registration message or the like to broker 14), it will begin putting heartbeat messages in heartbeat queue 42. As described in the above-incorporated patent application, the heartbeat messages provide an indication that application 16A is still functioning. As such, the heartbeat messages can be put in heartbeat queue 42 at predetermined time intervals (e.g., every X seconds). Should application 16A fail (e.g., "die" or disconnect), it will fail to put the heartbeat messages in heartbeat queue 42. In monitoring heartbeat queue 42, heartbeat manager 40 will detect any lack of heartbeat messages. Based thereon, heartbeat manager 40 will note the failure in the record for application 16A in heartbeat table 44, and put a dead application message in connection manager command queue 24, which is monitored by connection manager 12. Upon monitoring a dead application message, connection manager 12 will likewise note the failure in the corresponding record in connection manager table 24, and put a cleanup message in cleanup queue 50, which is monitored by cleanup manager 46. Cleanup manager 46 will note such failure in the appropriate record in cleanup table 48 and take any necessary cleanup actions. At that point, the records for application 16A can be removed from all three tables 24, 44 and 48 (e.g., by connection manager 12 or by the individual managers 12, 40 and 46).

Referring now to FIG. 4, a more detailed diagram of system 10 is shown. Specifically, FIG. 4 depicts all of the components of FIGS. 1 and 2 as well as additional details of connection manager 12. As shown, connection manager 12 includes connection manager registration system 60, queue monitoring system 62, application management system 64, heartbeat interface system 66 and cleanup interface system 70. The systems have the following functions:

connection manager registration system 60—Register connection manager 12 with queue broker 14 by publishing a connection manager registration message to broker control queue 20.

Queue monitoring system 62—Monitor connection manager command queue 24 and connection manager return code queue 26.

Application management system 64—Handle the management and processing of messages (e.g., registration messages, connection messages, etc.) received from applications 16A-B (e.g., from queue broker 14).

Heartbeat interface system 66—Interface with heartbeat components such as heartbeat table 44 to create a record for registered applications 16A-B.

Cleanup interface system 68—Interface with cleanup components such as putting cleanup messages in cleanup queue 50 when a dead application message is monitored in connection manager control queue 24.

These components will be more specifically described in conjunction with the illustrative usage scenarios below.

Illustrative Scenario I: Application 16A registers, starts sending heartbeat messages, and then unregisters.

Initially, connection manager registration system 60 will publish a registration message to broker control queue 20 so that connection manager 12 will be registered with queue broker 14. In addition, as indicated above, application 16A will register with queue broker 14 by publishing a registration command/message to connection manager control queue 18 and broker control queue 20. Application 16A will then check the application return code queue 28 to make sure that the publication was successful. Also, application 16A can register with connection manager 12 by publishing the registration message to connection manager control queue 18 and then checking for a response in application response queue 30. This message will be put in connection manager command queue 24 by queue broker 14, which is monitored by queue monitoring system 62. At this point the application management system 64 processes the registration command by placing an initial record in the connection manager table 34, indicating the application 16A's unique id and its availability status. Heartbeat interface system 66 also places an initial record into heartbeat table 44 table, so that the heartbeat manager 40 begins to expect heartbeats from application 16A. In addition, cleanup interface system 68 can place a record for application 16A in cleanup table 48. Application management system 64 then sends a response message back to the application 16A to let it know that it has been successfully registered. This response message is typically published by application management system 64 to connection manager response queue 22, and then put in application response queue 30 where it is read by application 16A.

Application 16A will now start a heartbeat thread, which begins to send heartbeat messages (at a fixed rate called the HeartRate) to heartbeat queue 42, which is being monitored by the heartbeat manager 40. The heartbeat message will typically have an expiration date on the message set to 2 times the HeartRate+1 second. The reason for this is that old messages in heartbeat queue 42 are cleaned up automatically if the heartbeat manager 40 fails. Upon restarting, heartbeat manager 40 would now only have to process a maximum of two messages for each application because the others would have expired and been discarded.

Now assume that application 16A unregisters at this point by publishing an unregister command/message. The message can be communicated to connection manager control queue 18 and broker control queue 20 of queue broker 14. From connection manager control queue 18, the unregister message will be put in connection manager command queue 24, which is monitored by queue monitoring system 62. Once monitored, application management system 64 will unregister application 16A by deleting its registration record in the connection manager table 34, and sending a response message back to application 16A. As indicated above, the response message will be published in connection manager response queue 22, and then put in application response queue 30. Application 16A will then put a delete heartbeat message in heartbeat queue 42 for heartbeat manager 40 to process. Heartbeat manager 40 will respond by deleting the record in the heartbeat table 44 for application 16A. In a typical embodiment, the delete heartbeat message is sent as a persistent message with no expiration date in case heartbeat manager 40 is "down." In such an instance, heartbeat manager 40 will delete the record when restarted. In any event, at this point, application 16A will now terminate the heartbeat thread.

Illustrative Scenario II: Application 16A Connects to Another Application 16B

In this illustrative scenario, assume that both applications 16A-B have already gone through the registration process as described above, and are sending heartbeat messages to heartbeat queue 42. Further assume that application 16A sends a connection command/message to connection manager 12 requesting connection to the other application 16B (e.g., by publishing the message to connection manager control queue 18, which is then put in connection manager command queue 24). At this point application management system 64 will create a connection record in the connection manager table 34 and create the necessary dynamic queues for applications to communicate. Thereafter, cleanup interface system 68 will place the necessary records in the cleanup table 48 for the dynamic queues.

In addition, application management system 64 will create a subscription for each of the applications 16A-B, using the dynamic queue names as reply to queues. This enables the system 10 to take advantage of "MQIntegrator" message flows that could potentially modify/translate a message as it flowed from one application to another. This also assumes that a message flow is defined. If one is not defined, the connection message passes through "as is." Regardless, cleanup interface system 68 then places the necessary records in the cleanup table 48 to reflect the subscription. Once applications 16A-B are directly connected, they can communicate with one another using the dynamic queues. In a typical embodiment, at least two types of dynamic queues can be created, a command queue and a response queue. Messages send from one application to another can be put in and read from the command queue, while responses can be put in and read from the response queue. Moreover, for a connection between two applications 16A-B, a single command queue and a single response queue can be provided. Alternatively, each application could have its own command queue and its own response queue.

If any of the above steps fail, then the cleanup interface system 68 will send a cleanup message to cleanup queue 50 to clean up for that application (e.g., based on application identification) and delete all related resources, which are the dynamic queues and subscriptions. Then application management system 64 will send and appropriate message back to each application 16A (e.g., via connection manager response queue 22 and application response queue 30) to let the applications 16A-B know what happened.

Illustrative Scenario III: An Application 16A sends a disconnect command/message to connection manager 22.

In this scenario, assume that application 16A was registered and connected to application 16B as described above. Further assume that application 16A desired to disconnect from application 16B. In this case, a disconnection message will be published from application 16A to connection manager control queue 18, which is then put in connection manager command queue 24 as monitored by queue monitoring system 62. The disconnection message will be processed by application management system 64, which will update the records in connection manager table 34 to reflect that the applications 16A-B have disconnected. Cleanup interface system 68 will then send a cleanup message to cleanup queue

50 to provide cleanup for the resources associated with applications 16A-B (e.g., the dynamic queues and subscriptions).

Shown below is illustrative syntax for the various actions/commands carried out by applications or components within system 10 as described above. It should be appreciated in advance that this syntax is intended to be illustrative only and that other implementations could exist.

```
Application Register
    <GTC>
        <Command> RegAvailablility </Command>
        <ID>MachineName:AppName:Pid</ID>
        <State> Available | Unavailable </State>
        <RegOpt>Single | Multiple </RegOpt>
    </GTC>
Application UnRegister
    <GTC>
        <Command> DeregAvailablility </Command>
        <ID>MachineName:AppName:Pid</ID>
    </GTC>
Application Connect to Another Application
    <GTC>
        <Command> Connect </Command>
        <RequestorID>MachineName:AppName:Pid</ID>
        <ToID>MachineName:AppName:Pid</ID>
        <DynamicQName> The dynamic queue name </DynamicQName>
    </GTC>
Application DisConnect
    <GTC>
        <Command> DisConnect </Command>
        <RequestorID>MachineName:AppName:Pid</ID>
        <FromID>MachineName:AppName:Pid</ID>
        <Status>Available
            <ID> aspectpc1:NPR:12345</ID>
        </Status>
    </GTC>
Dead Application
    <GTC>
        <Command>DeadApp</Command>
        <AppId> + appId + </AppId>
        <Death> + deathType + <Death>
        <HeartRate> + heartRate + </HeartRate>
        <MaxSkippedBeats> + maxSkippedBeats + </MaxSkippedBeats>
        <LastHeartBeat> + lastHeartBeat + </LastHeartBeat>
        <ExpirationDate> + expirationDate + </ExpirationDate>
    </GTC>
Cleanup
    <GTC>
        <Command>Cleanup</Command>
        <ID> + id + </ID>
        <ResourceID> + resourceId + </ResourceID>
    </GTC>
Heartbeat
    <GTC>
        <Command> regular_heartbeat </Command>
        <Originator>application</Originator>
        <AppId> + GTCSession.getCorrelId( ) + </AppId>
        <HeartRate> + heartrate + </HeartRate>
        <MaxSkippedBeats> + maxskippedbeats + </MaxSkippedBeats>
        <LastHeartBeat> + time.toString( ) + </LastHeartBeat>
        <ExpirationDate> + time.toString( ) + </ExpirationDate>
        <AppMsg> + regular_heartbeat + </AppMsg>
    </GTC>
Response (e.g., sent from the connection manager 12 back to the
Application 16A)
<GTC>
    <Response>
        <Command> Connect </Command>
        <CorrID>MachineName:AppName:Pid</ID>
        <PubID> Host:App:Pid </PubID>
        <ResponseType> Rc | Informational </ResponseType>
        <Status> Ok | Warning | Error </Status>
        <Message> Your message string </Message>
        <State> Available | Unavailable | Connected | Disconnected </State>
        <StateMsg> Disconnected from appxxxx </StateMsg>
        <InfoMsg> Some Text </InfoMsg>
    </Response>
</GTC>
```

II. Computerized Implementation

Figure 5:
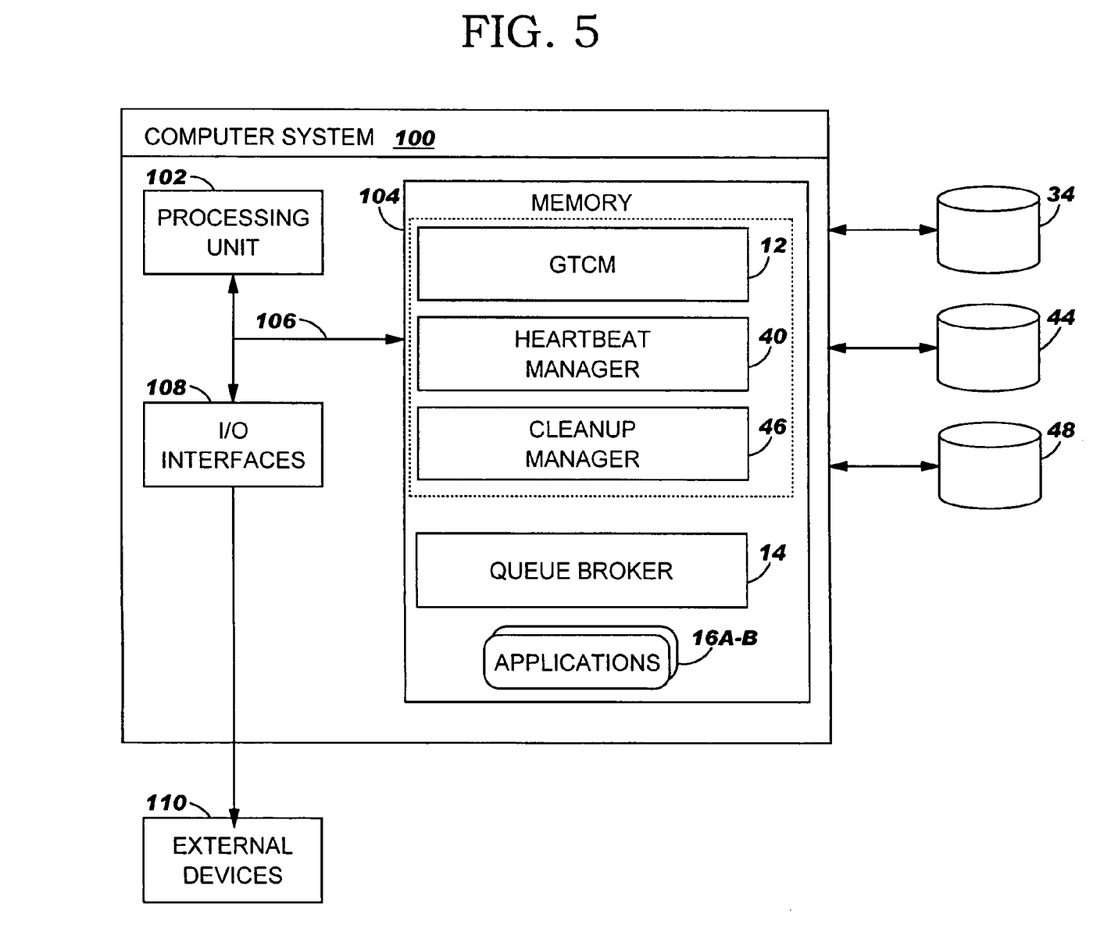
FIG. 5 depicts an illustrative computerized implementation of the present invention.

Referring now to FIG. 5, a more specific computerized implementation of the present invention is shown. As depicted, a computer system 100 is provided on which connection manager 12, queue broker 14, heartbeat manager 40, cleanup manger 46 and applications 16A-B are loaded. Computer system 100 is intended to represent any type of computer system capable of carrying out the teachings of the present invention. For example, computer system 100 could be a laptop computer, a desktop computer, a workstation, a handheld device, a client, a server, etc.

Moreover, it should be appreciated that it is not necessary for all of these components to be loaded on a single computer system as shown. Rather, these components could be loaded on two or more computer systems that communicate over a network such as the Internet, a local area network (LAN), a wide area network (WAN), a virtual private network (VPN), etc. In such an embodiment, communication throughout the network could occur in a client-server or server-server environment via a direct hardwired connection (e.g., serial port), or via an addressable connection that may utilize any combination of wireline and/or wireless transmission methods. Conventional network connectivity, such as Token Ring, Ethernet, WiFi or other conventional communications standards could be utilized. Moreover, connectivity could be provided by conventional TCP/IP sockets-based protocol. In this instance, an Internet service provider could be utilized to establish connectivity. Still yet, connection manager 12, heartbeat manager 40 and cleanup manager 46 could be provided as a single program as demonstrated by the dashed lines in FIG. 5. Although the various queues of FIGS. 1, 2 and 4 have not been shown in FIG. 5 for simplicity purposes, it should be understood that such queues are provided.

In any event, a depicted, computer system 100 generally includes processing unit 102, memory 104, bus 106, input/output (I/O) interfaces 108, and external (I/O) devices/resources 110. Processing unit 102 may comprise a single processing unit, or be distributed across one or more processing units in one or more locations, e.g., on a client and server. Memory 104 may comprise any known type of data storage and/or transmission media, including magnetic media, optical media, random access memory (RAM), read-only memory (ROM), a data cache, a data object, etc. Moreover, similar to processing unit 102, memory 104 may reside at a single physical location, comprising one or more types of data storage, or be distributed across a plurality of physical systems in various forms.

I/O interfaces 108 may comprise any system for exchanging information to/from an external source. External devices/resources 110 may comprise any known type of external device, including speakers, a CRT, LED screen, hand-held device, keyboard, mouse, voice recognition system, speech output system, printer, monitor/display, facsimile, pager, etc. Bus 106 provides a communication link between each of the components in computer system 100 and likewise may comprise any known type of transmission link, including electrical, optical, wireless, etc.

Tables 34, 44 and 48 can be any type of structures (e.g., databases) capable of providing storage for data under the present invention. As such, tables 34, 44 and 48 could include one or more storage devices, such as a magnetic disk drive or an optical disk drive. In another embodiment, tables 34, 44 and 48 includes data distributed across, for example, a local area network (LAN), wide area network (WAN) or a storage area network (SAN) (not shown). Although not shown, additional components, such as cache memory, communication systems, system software, etc., may be incorporated into computer system 100.

Connection manager 12, heartbeat manager 40 and cleanup manager 46 each include systems or means for performing the functions described above. Specifically, they provide for the central management, heartbeat monitoring and cleanup of applications 16A-B. While shown and described herein as a way to centrally manage applications, it is understood that the invention further provides various alternative embodiments. For example, in one embodiment, the invention provides a computer-readable medium that includes computer program code to enable a computer infrastructure to centrally manage applications. To this extent, the computer-readable medium includes program code that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 104 and/or a storage system (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as an Internet Service Provider, could offer to build social networks as described above. In this case, the service provider can create, maintain, support, etc., a computer infrastructure, such as computer infrastructure that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a method for centrally managing applications. In this case, a computer infrastructure, can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as computer system 100, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims. For example, connection manager 12 is shown with a certain configuration of sub-systems in FIG. 4 for illustrative purposes only.

We claim:

1. A computer system comprising:
at least one computing device including a connection manager for centrally managing computer applications by performing a method including:
registering the connection manager with a queue broker and one or more applications;
monitoring a connection manager command queue by the connection manager that receives a request message from one or more applications through the queue broker that is posted to the queue broker by the one or more applications;
publishing a response message to the request message in a connection manager response queue;
sending the response message to the queue broker;
a heartbeat manager monitoring a heartbeat queue, wherein the heartbeat queue receives heartbeat messages from the one or more computer applications indicating their continued operation, and
creating records of heartbeat messages in a heartbeat table upon registration of the one or more computer applications, wherein the records comprise application unique ID and availability status;
putting a dead application message in the connection manager command queue when the heartbeat queue fails to receive the heartbeat messages by the heartbeat manager;
putting a cleanup message in a cleanup queue in response to the dead application message being put in the connection manager command queue by the connection manager;
monitoring the cleanup queue, and in response to the dead application message, to remove records of heartbeat messages in the heartbeat table by the connection manager; and
taking cleanup actions in response to the dead application messages including removing records corresponding to dead applications from a cleanup table.

2. The computer system of claim 1, wherein the queue broker comprises:
a connection manager control queue for initially receiving the request message from the one or more applications;
a broker control queue for receiving a registration message from the one or more applications and a registration message from the connection manager; and
a connection manager response queue for receiving the response message from the connection manager.

3. The computer system of claim 2, further comprising:
a connection manager return code queue for receiving connection manager return code from the queue broker;
a set of application return code queues for receiving computer application return code from the queue broker; and
a set of application response queues for receiving the response messages from the connection manager response queue of the queue broker.

4. The computer system of claim 1, further comprising a connection manager table containing records of the computer applications.

5. A method for centrally managing computer applications, comprising:
registering the computer applications with a connection manager and a queue broker;
receiving heartbeat messages indicating the status of the computer applications in a heartbeat queue that is monitored by a heartbeat manager from the computer applications, and
creating records of heartbeat messages in a heartbeat table upon registration of the computer application, wherein the records comprise application unique ID and availability status;
the heartbeat manager putting a dead application message in a connection manager command queue that is monitored by the connection manager if the heartbeat messages are not received;
the connection manager putting a cleanup message in a cleanup queue that is monitored by a cleanup manager in response to the dead application message being put in the connection manager command queue; and
monitoring the cleanup queue, and in response to the dead application message removing records of heartbeat messages in the heartbeat table by the heartbeat manager; and
taking cleanup actions in response to the dead application messages including removing records corresponding to dead applications from a cleanup table.

6. The method of claim 5, wherein the registering step comprises receiving subscription requests for the connection manager and the computer application in a broker control queue of the queue broker.

7. The method of claim 5, wherein the registering of the computer application comprises the connection manager creating a record for the computer application in the heartbeat table that is managed by the heartbeat manager, and in a connection manager table that is managed by the connection manager.

8. The method of claim 5, further comprising:
receiving a request message for the computer application in the connection manager command queue from a connection manager control queue of the queue broker;
processing the request message in the connection manager; and
communicating a response message to the request message from the connection manager to a connection manager response queue of the broker queue.

9. The method of claim 8, further comprising communicating the response message from the connection manager response queue to an application response queue that is monitored by the computer application.

10. A system, stored in a memory and when executed by a processor, for centrally managing computer applications, comprising:
a connection manager for receiving and processing request messages from the computer applications using the processor wherein the connection manager manages a connection manager table and monitors a connection manager command queue, and wherein the connection manager command queue receives request messages from a connection manager control queue of a queue broker;
a heartbeat manager for monitoring a heartbeat of the computer applications using the processor wherein the heartbeat manager monitors a heartbeat queue, wherein the heartbeat queue receives heartbeat messages from the computer applications reflecting their continued operation, and wherein the heartbeat manager records heartbeat messages in a heartbeat table and wherein the heartbeat manager puts a dead application message on the connection manager command queue when the heartbeat messages are not received; and
a cleanup manager wherein the cleanup manager manages a cleanup table and monitors a cleanup queue, and wherein the connection manager puts a cleanup message in the cleanup queue in response to the dead application message being put in the connection manager command queue and wherein the heartbeat manager removes records of heartbeat messages in the heartbeat table in response to the dead application message in the cleanup queue using the processor, wherein the cleanup manager taking cleanup actions in response to the dead application messages including removing records corresponding to dead applications from the cleanup table, wherein the records comprise application unique ID and availability status.

11. The system of claim 10, further comprising a queue broker for facilitating communications between the computer applications and the connection manager, wherein the queue broker comprises:
a connection manager control queue for initially receiving the request messages from the computer applications;
a broker control queue for receiving registration messages from the computer applications and the connection manager; and
a connection manager response queue for receiving response messages from the connection manager pursuant to the processing of the request messages by the connection manager.

12. The system of claim 11, further comprising
a connection manager return code queue for receiving connection manager return code from the queue broker;
a set of application return code queues for receiving computer application return code from the queue broker; and
a set of application response queues for receiving the response messages from the connection manager response queue of the queue broker.

13. A program product stored on a computer readable storage medium for centrally managing computer applications, the computer readable storage medium comprising program code when executed by a processor for performing the following steps:
registering a connection manager with a queue broker and one or more applications;
monitoring a connection manager command queue by the connection manager that receives request messages from the queue broker that are posted to the queue broker by the computer applications;
processing the request messages monitored in the connection manager command queue;
publishing response messages, pursuant to the processing of the request messages, to the queue broker;
a heartbeat manager monitoring a heartbeat queue, wherein the heartbeat queue receives heartbeat messages from the computer applications indicating their continued operation, and
creating records of heartbeat messages in a heartbeat table upon registration of the computer applications, wherein the records comprise application unique ID and availability status;

putting a dead application message in the connection manager command queue when the heartbeat queue fails to received heartbeat messages by the heartbeat manager;

putting a cleanup message in a cleanup queue in response to the dead application message being put in the connection manager command queue by the connection manager;

monitoring the cleanup queue, and in response to the dead application message, to remove records of heartbeat messages in the heartbeat table by the connection manager; and taking cleanup actions in response to the dead application messages including removing records corresponding to dead applications from a cleanup table.

14. A method for deploying an application for centrally managing computer applications, comprising:

providing a computer infrastructure configured to register the computer applications with a connection manager and a queue broker;

receive heartbeat messages in a heartbeat queue that is monitored by a heartbeat manager from the computer applications indicating their continued operation, and create records of heartbeat messages in a heartbeat table upon registration of the one or more computer applications using the processor, wherein the records comprise application unique ID and availability status;

the heartbeat manager put a dead application message in a connection manager command queue that is monitored by the connection manager if the heartbeat messages are not received; and the connection manager put a cleanup message in a cleanup queue that is monitored by a cleanup manager in response to the dead application message being put in the connection manager command queue;

monitoring the cleanup queue, and in response to the dead application message, to remove records of heartbeat messages in the heartbeat table by the heartbeat manager; and taking cleanup actions in response to the dead application messages including removing records corresponding to dead applications from a cleanup table.

\* \* \* \* \*